Nov. 17, 1964   R. M. TUCK ETAL   3,157,067
TRANSMISSION
Filed Jan. 9, 1958   4 Sheets-Sheet 1

Fig.1

INVENTORS
Robert M. Tuck,
Paul B. Pritchard &
Mark E. Fisher
BY W.C. Middleton
ATTORNEY

Fig. 2

INVENTORS
Robert M. Tuck,
Paul B. Pritchard &
Mark E. Fisher
BY
W. C. Middleton
ATTORNEY

3,157,067
TRANSMISSION
Robert M. Tuck, Indianapolis, Paul B. Pritchard, Danville, and Mark E. Fisher, Carmel, Ind., assignors to General Motors Corporation, Detroit, Mich., a corporation of Delaware
Filed Jan. 9, 1958, Ser. No. 708,038
46 Claims. (Cl. 74—754)

This invention relates to a multiratio transmission particularly suitable for farm implement drives and to a hydraulic control system for the transmission.

The transmission provides a drive train providing either a torque converter drive or a direct drive available in six forward and reverse speed ratios. The transmission has a torque converter unit which may provide a torque converter drive or a direct drive, a two-speed gear unit and a three-speed gear unit which in combination provide six speed ratios, and a forward and reverse unit permitting the transmission to operate in any ratio in either forward or reverse drive. The transmission also provides a power take-off shaft, which may be used to drive a farm implement, driven by the torque converter pump element which normally rotates with the engine shaft.

The hydraulic control system employs either a manual valve or a manual valve and a slave valve to selectively actuate the transmission gearing in six speed ratios. The main line pressure of the hydraulic control system may be manually controlled at the will of the operator to provide a lower line pressure and softer clutch engagement for more gradual starting and softer engagement of the ratio engaging devices during shifting. The flow of fluid and the pressure of the fluid supplied to the ratio engaging devices is controlled by a fluid control valve acting in combination with an accumulator to provide a proper pressure rise for shockless engagement of the ratio engaging devices. The transmission mechanism may also be employed to retard or stop the transmission drive train to permit shifting unsynchronized gearing and to retard the vehicle by actuating a snubber valve to simultaneously partially or fully engage more than one speed ratio at the same time.

An object of the invention is to provide in an automatic transmission a drive train having a torque converter and a direct drive device which may alternatively provide torque converter drive or direct drive, a two-speed gear unit and a three-speed gear unit which in combination provide six speed ratio drives and a forward and reverse unit which in combination with the other unit may provide the torque converter drive or the direct drive in either of the six speed ratios in either forward or reverse.

Another object of the invention is to provide in a transmission having a torque converter and a gear unit, a power take-off connected to the torque converter input member and located transversely to the torque converter between the torque converter and the gear unit.

Another object of the invention is to provide in a transmission having six speed ratios provided by a two-speed and a three-speed unit, a manual valve operating in conjunction with a slave valve to control the transmission gear unit to provide six forward speed ratios.

Another object of the invention is to provide in a hydraulic control system for a transmission a pressure supply system employing a control valve operated in response to the flow and pressure of fluid supplied to a ratio engaging device to control the rate of flow and the pressure of fluid supplied to the ratio control device to provide a low rate of pressure increase during engagement of the ratio engaging device.

Another object of the invention is to provide in a hydraulic control system a source of fluid pressure regulated at a normal pressure and means controllable at the will of the operator to reduce the normal pressure to provide softer ratio engaging device engagement.

Another object of the invention is to provide in a multi-ratio transmission having a hydraulic control system for establishing drive in a plurality of ratios a device controlled at the will of the operator to engage more than one forward speed ratio simultaneously to retard or brake the vehicle.

These and other objects of the invention will be more apparent from the following description and drawings showing a preferred embodiment of the invention.

Figure 1:
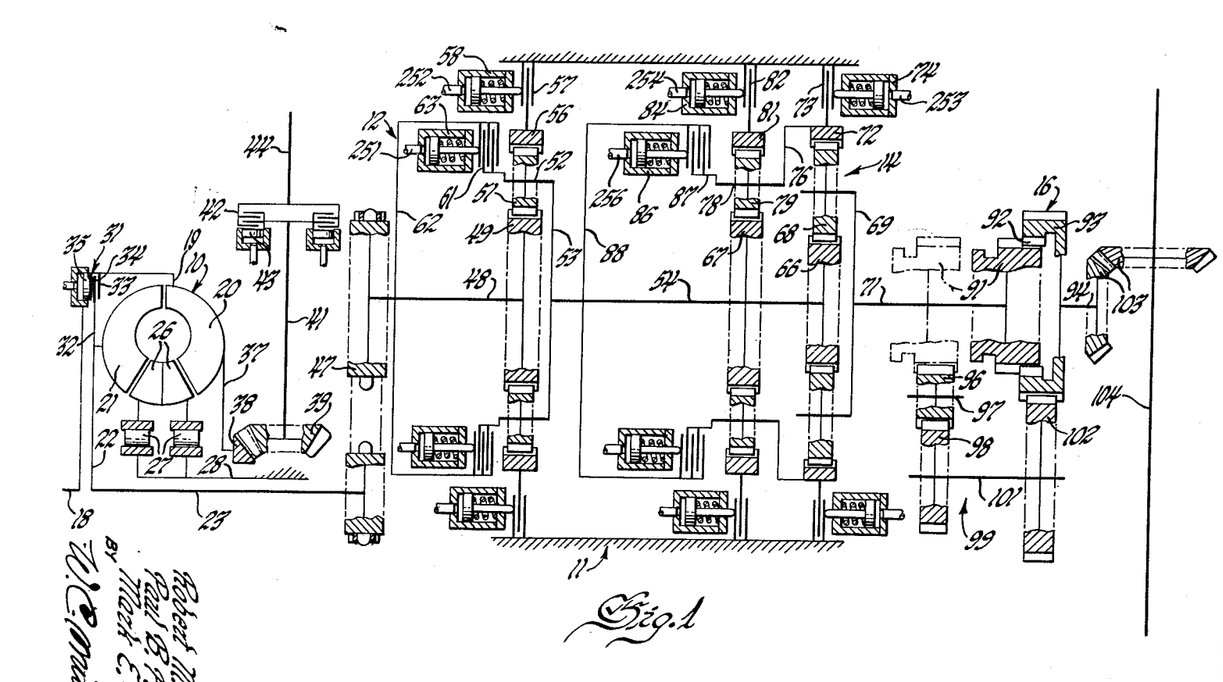
FIG. 1 shows diagrammatically the transmission drive train.

The transmission drive mechanism illustrated in FIG. 1 employs a torque converter and lock-up clutch unit 10, a multiratio gear unit 11 providing six speeds and consisting of a two-speed unit 12 and a three-speed unit 14 and a forward and reverse unit 16. Thus, the transmission may provide either converter drive or direct drive in six speed ratios for either forward or reverse drive.

The torque converter unit 10 is driven by an input shaft 18 which drives the torque converter housing 19 and the torque converter pump 20. The torque converter pump drives the torque converter turbine 21 hydrodynamically in a plurality of torque ratios in a well known manner. The turbine 21 is connected by the hub 22 to the torque converter output shaft 23. The torque converter illustrated employs two stators 26, each being connected by a one-way brake 27 to the ground sleeve 28 which is secured to the transmission housing. The direct drive or lock-up clutch 31 has a driven plate 32 mounted on the hub 22 located between a fixed plate 33 on the housing 19 and a movable plate 34 which is formed as a part of the piston of the fluid motor 35 which actuates the movable plate to engage the clutch 31.

The housing 19 has an extension 37 which drives the bevel gear 38 mounted coaxially with shaft 23. Power take-off gear 39, driven by gear 38, is connected by a shaft 41 and a clutch 42 operated by the fluid motor 43 to the power take-off shaft 44, all extending at right angles to the converter shaft between the converter unit 10 and gear unit 11.

The torque converter shaft 23 is connected by a chain drive 47 to the laterally offset transmission input shaft 48 which drives the input sun gear 49. The input sun gear meshes with the planetary pinions 51 rotatably mounted on the carrier 52 which is connected by a hub 53 to the intermediate shaft 54 or output member of the two-speed unit 12. The planetary pinions 51 also mesh with the ring gear 56 which may be retarded by the reaction brake or drive ratio engaging device 57 to establish a low speed ratio in the two-speed unit 12. The ratio engaging device 57 is engaged by the fluid motor 58. High ratio or direct drive of the two-speed unit 12 is established by engaging the clutch or drive ratio engaging device 61 which connects the carrier 52 directly through the hub 62 to the shaft 48. Clutch 61 is engaged by the fluid motor 63.

The intermediate shaft 54 connects the two-speed unit 12 to the three-speed unit 14 and drives the first input sun gear 66 and the second input sun gear 67. The first input sun gear 66 meshes with the pinions 68 rotatably mounted on a carrier 69 which drives the ratio unit output shaft 71. The pinions 68 mesh with the first ring gear 72 which may be retarded by the reaction brake or drive ratio engaging device 73 which is actuated by the fluid motor 74 to provide low ratio in a three-speed unit 14. In low ratio the first sun gear 66 drives the carrier 69 and shaft 71 at a slow speed since the ring gear is stationary. Ring gear 72 is connected by an annulus 76 to the carrier 78 for the pinions 79 which mesh with the second gear 67 and the second ring gear 81. The reaction brake or intermediate ratio engaging device 82 is engaged by a fluid motor 84 to hold the intermediate ring gear 81 to provide intermediate ratio drive between intermediate shaft 54 and shaft 71. In intermediate ratio the second sun gear drives carrier 78 and ring gear 72 at a slow speed so that first sun gear 66 rotates the carrier 69 and shaft 71 faster than in low. The three-speed unit 14 may be locked up to provide a third ratio or direct drive by actuating the fluid motor 86 to engage the clutch or direct drive engaging device 87 and thus connect the carrier 78 by the hub 88 to the intermediate shaft 54. When the carrier 78 and first and second sungears 66 and 67 are driven at the same speed the gearing is locked up and provides direct drive to the shaft 71.

The forward and reverse unit 16 employs a gear 91 suitably splined to the shaft 71 for axial movement between the forward position shown in full lines and the reverse position shown in dotted lines. In the forward position the gear 91 is clutched to the gear type clutch teeth 92 on the internal surface of the gear 93 fixed to the output shaft 94. For reverse drive the gear 91 is moved forward to the dotted position to mesh with the idler gear 96 mounted on a countershaft 97 which drives an input cluster gear 98 of the cluster gear unit 99. The gear 98 is connected by suitable shaft 101 to the second gear 102 of cluster gear and meshes with the output gear 93 to drive the output shaft 94 in reverse. The output shaft 94 may be connected by a bevel gear set 103 to the transverse drive shaft 104.

Hydraulic Control System

Figure 2:
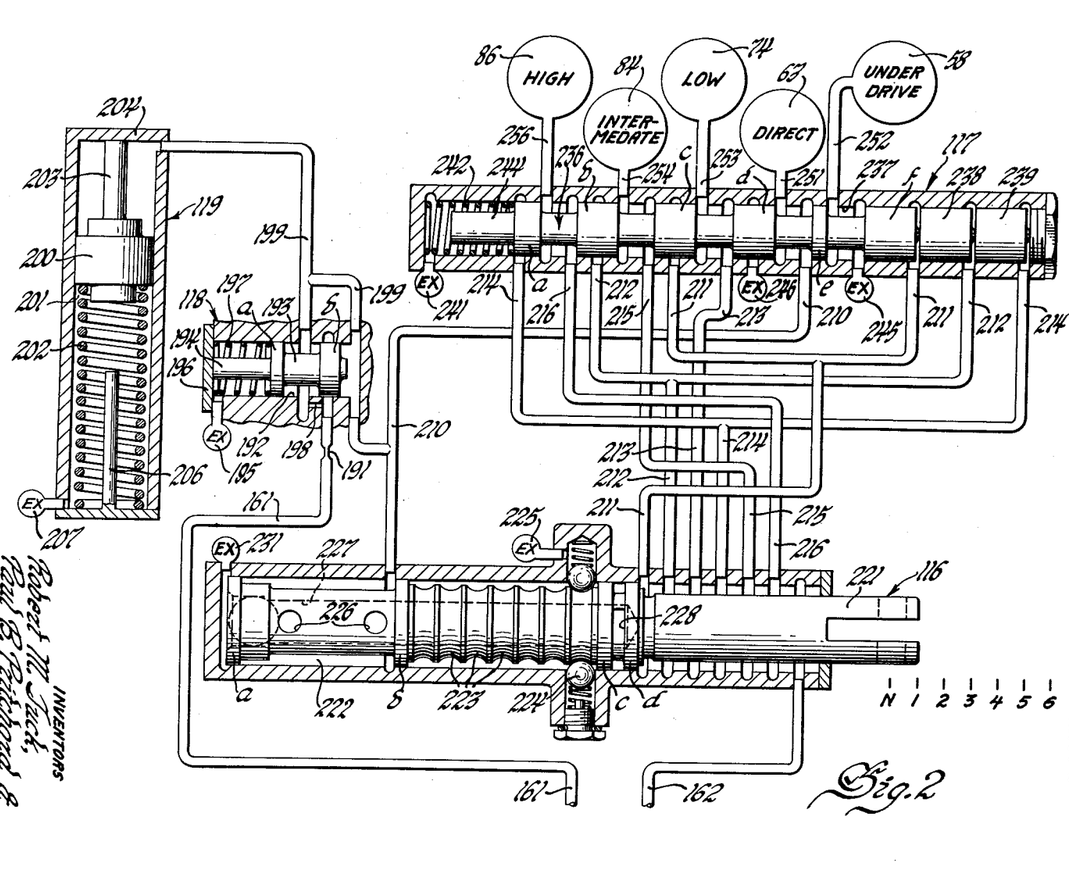
FIG. 2 with FIG. 3 placed immediately below shows the hydraulic control system of the transmission.
Figure 3:
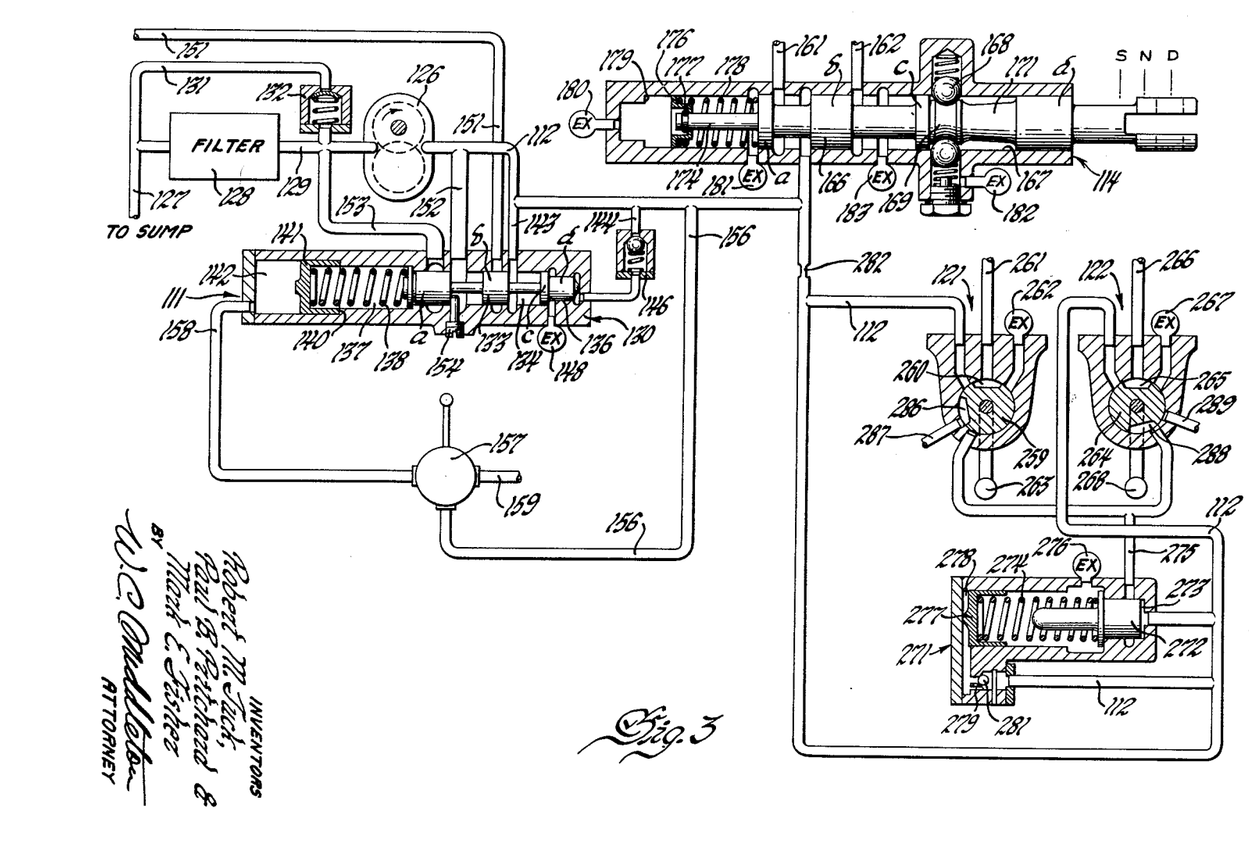

The hydraulic control system is manually controlled to hydraulically actuate the drive engaging devices in the transmission drive unit to provide six forward speed ratios either with converter drive or direct drive in either forward or reverse. The power take-off clutch 42 is hydraulically engaged by a manual control. The torque converter normally provides a variable torque ratio drive in a well-known manner in accordance with the load but may be locked up to provide a direct drive by engaging the direct drive cluch 31. The six-speed gear until 11 is hydraulically controlled by engaging certain of the ratio drive engaging devices in combination. The drive engaging devices may be actuated by the hydraulic control system when the engine is running and driving the input fluid supply system 111. The fluid is connected by the main line 112 to the snubber valve 114 which blocks the flow of fluid in the neutral position and connects that fluid in the drive position to the manual selector valve 116 and a slave valve 117 to actuate the fluid motors of the six-speed gear unit 11. The fluid supply for these fluid motors is controlled with regard to pressure rise during the engagement of each drive engagement device by a control valve 118 and accumulator 119. The main line is also connected to a lock-up clutch valve 121 to control the engagement of the lockup clutch 31 and a power take-off valve 122 to control the engagement of the power take-off clutch 42.

Fluid Supply

The fluid supply for operating the transmission is provided by a gear pump 126 which may be driven by portion 37 of the input housing 19 or the shaft 41 both of which are continuously driven by engine shaft 18. Fluid is supplied to the pump from a sump by a line 127 which passes through filter 128 to the pump inlet line 129. In the event that the filter becomes clogged a by-pass is provided through line 131 and the relief valve 132 to the pump inlet line 129.

The pressure regulator valve 130 has a valve element 133 having lands $a$ and $b$ and $c$ of equal diameter located in a main bore portion 134 and a land $d$ of smaller diameter located in a reduced bore portion 136 at one end of the valve. At the other end of the valve element 133 the bore has an enlarged portion 137 providing a chamber for the spring 138 which engages the end of a land $a$ and seats on a piston 141 located in a cylinder 142 for limited movement between the end wall and shoulder 140. The line 112 has a branch 143 which is always connected to the bore 134 between the lands $b$ and $c$ and a branch 144 connected through a one-way check valve 146 to the closed end of the reduced bore portion 136 to act on the free end of the land $d$. To prevent fluid lock in the bore 136 the land $d$ has sunfficient clearance in the bore 136 to provide an orifice by-pass passage around the land $d$ to the exhaust port 148. The main line fluid acting through branch 144 on the end of land $d$ is acting on an unbalanced area and tends to move the valve element 133 against biasing spring 138 to regulate the pressure in line 112 by first venting branch 143 to the converter line 151 which supplies fluid to the torque converter and then by venting branch 152 of main line 112, which is always connected between lands $a$ and $b$, to the branch 153 of the pump inlet line 129 to unload the pump 126 by permitting free circulation from the outlet to the inlet. A pin 154 fixed in the pump body projects into the space between the lands $a$ and $b$ of valve element 133 to limit movement of the valve element 133. Main line 112 also has a branch 156 connected to a three-way valve 157 when in one position connects the main line branch 156 to line 158 and the cylinder 142 to increase the biasing force of spring 138. The valve 157 may be moved to a low pressure position blocking branch 156 of the main line and connecting line 158 to an exhaust 159 to exhaust cylinder 142 to permit the piston 141 to move to the end of cylinder 142 to reduce the biasing force of spring 138 of the valve element 133, and thus reduce the main line pressure to a low value.

Snubber Valve

The snubber valve 114 controls the flow of fluid from the main line 112 to the supply line 161 and the exhaust from the exhaust line 162 to provide a neutral, drive and snubber range. With the snubber valve 114 in the neutral position the control system cannot engage any ratio in the six-speed gear unit 11 to drive or snub the vehicle. In drive position the control system including the selector valve 116 and slave 117 may operate to engage the selected ratio. In the snubber position the control system including the selector valve 116 and the slave valve 117 engages three ratios to slow or brake the transmission to permit shifting of the unsynchronized gear unit 16 or to retard the vehicle. The snubber valve has a valve element 166 having lands, $a$, $b$, $c$ and $d$ of equal diameter located in a bore 167. With the valve element 166 in the drive position as shown the spring biased detent balls 168 engage an annular recess 169. As the valve element 166 is moved from the drive to the neutral position the detent balls 168 will engage the lower portion of the tapered recess 171 and during movement to the snubber position balls will ride on the inclined surface of the recess 171. Thus, the biasing force will provide a small force tending to return the valve element 166 from snubber position to neutral position. The valve element 166 also has a stud 174 extending from land $a$. A spring abutment 176 is slidably mounted and retained on the stud by a snap ring 177. The spring 178 is normally positioned between the land $a$ and the abutment 176 to urge the abutment to engage snap ring 177. The valve element 166 may be moved from the drive position illustrated to the neutral position without compressing spring 178. However, in the neutral position the abutment 176 just engages the shoulder 179 in the bore 167 and thereafter movement from the neutral position to the snubber position is resisted by the biasing force of spring 178.

In the drive position illustrated, valve element 166 connects the main line 112 between the lands *a* and *b* to the supply line 161 and connects the exhaust line 162 between the lands *b* and *c* to the exhaust port 183. The end of the bore 167 containing the spring 178 is vented by exhausts 180 and 181 and the detent portion of the bore 167 between the lands *c* and *d* is vented by exhaust 182.

In the neutral position the main line is blocked by land *b* and supply line 161 is connected to exhaust 181 and line 162 to exhaust 183. In the snubber position main line 112 is connected between lands *b* and *c* to exhaust line 162 and supply line 161 is blocked by land *b*.

Control Valve and Accumulator

Figure 5:
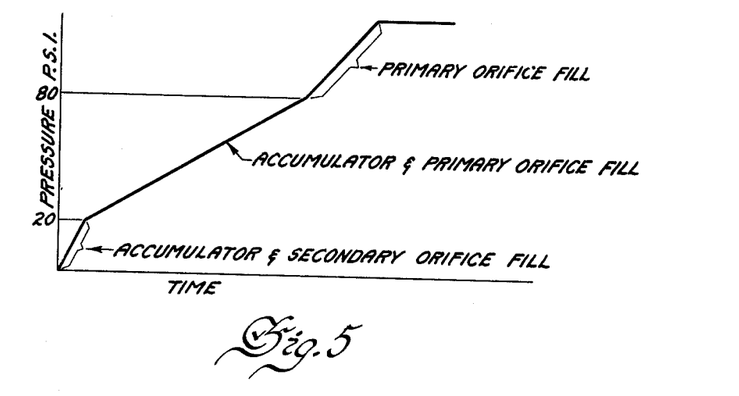
FIG. 5 is a curve showing the control pressure increase on engagement of a drive device.

The supply line 161 is connected to the control valve 118 and the accumulator 119 to regulate the pressure rise in accordance with the curve of FIG. 5 during each application of a ratio engaging device. The supply line 161 is connected through the secondary orifice 191 to the bore 192 of the flow control valve 118. The flow control valve has an element 193 having lands *a* and *b* of equal diameter located in bore 192 which is vented at one end by exhaust 195 adjacent abutment 196. At the free end of the land *a* valve element 193 has a stud 194 which engages the abutment 196 at one end of the bore to limit the movement of valve 193 under the influence of accumulator pressure from line 199 in the restricted position illustrated. The spring 197 located between the abutment 196 and the land *a* urges the valve element 193 in the opposite direction to the unrestricted position. Valve 193 in the restricted position blocks the supply line 161 so that flow to the accumulator and the feed line 210 must pass through the secondary orifice 191 and the smaller primary orifice 198 to the accumulator line 199. In the unrestricted position orifice 198 is by-passed.

Accumulator line 199 is connected to the accumulator 119 which has a piston 200 located in a bore 201. Accumulator 119 is illustrated with the piston 200 urged by the spring 202 to the discharge position where the stop pin 203 engages the end wall 204 of the bore 201. Fluid is supplied via accumulator line 199 to the bore 201 above the piston 200. The fluid will start to move the piston, compressing the spring 202, at 20 p.s.i. and continue to move the piston down with increasing pressure until at 80 p.s.i. piston 200 will engage the stop abutment 206 in the fully charged position. The exhaust 207 prevents the accumulation of fluid in the spring chamber portion of bore 201. The accumulator line 199 is connected to the ratio line 210 through the end of bore 192 of the flow control valve 118 so that the pressure in the ratio line, which is supplied to the ratio engaging devices, acts on the valve element 193 to move the valve from the unrestricted to the restricted position against the spring 197 at a pressure of 20 p.s.i. The control valve 118 and accumulator 119 act together to control the pressure rise during the engagement of a drive ratio in accordance with the curve shown in FIG. 5 as explained below under "Drive Operation."

The Selector Valve

The selector valve 116 is manually controlled to connect the ratio line 210 carrying main line pressure as regulated by the flow control valve 118 and the accumulator 119 to the first, second, third, fourth, fifth and sixth ratio control lines respectively indicated as 211, 212, 213, 214, 215 and 216. The selector valve has a valve element 221 having lands *a*, *b*, *c* and *d* of equal diameter located in a bore 222. The valve element 221 has a plurality of annular detent grooves engaged by spring biased detent balls 224 to position the valve in neutral and the ratio positions one through six. The ratio line 210 is connected in all valve positions between the lands *a* and *b* and through the ports 226, bore 227 and port 228 in valve element 221 to the space between the lands *c* and *d*. Thus, with the valve in the neutral position as shown the flow of fluid through this valve is blocked. However, on movement of the valve through the ratio positions one through six the valve will successively supply each of the individual ratio control lines one through six numbered 211 through 216. The exhaust 231 prevents accumulation of fluid between the end of the bore 222 and the land *a* in the valve element 221. At the other end of the valve element beyond the land *d* in all positions of valve operation an exhaust is provided by the exhaust line 162.

Slave Valve

Slave valve 117 is connected between the manual valve 116 and the ratio engaging motors to actuate a motor in the two-speed unit 11 and a motor in the three-speed unit 12 to provide six ratios. Slave valve element 236 has lands *a*, *b*, *c*, *d*, *e*, and *f* of equal diameter located in a bore 237. At the closed end of the bore 237 adjacent the land *f*, plugs 238 and 239 are located in the bore. At the other end of the valve element 236 adjacent the land *a* the bore 237 is vented by exhaust 241 and has a spring 242 located between the end of the bore and the land *a* to bias the valve element 236, plugs 238 and 239 to the right end of the bore or the direct drive position. A pin 244 extending from the land *a* limits movement of the valve element 236 under the influence of fluid acting on land *f* or plugs 238 or 239 in the underdrive position.

In the direct drive position slave valve element 236 connects ratio line 210 to the direct drive motor 63 of the two-speed unit and control lines 216, 215 and 213 respectively to the high drive motor 86, the intermediate drive motor 84 and the low drive motor 74. When fluid is supplied by either one of control lines 211, 212 or 214 to act on the end of land *f* or plugs 238 or 239 the valve element 236 is moved to the underdrive position. In this position ratio line 210 is connected to the underdrive motor 58 and the control lines 211, 212 and 214 are connected respectively to the low motor 74, intermediate motor 84 and high motor 86. Exhausts 245 and 246 exhaust the underdrive line 252 and the direct drive line 251 respectively. The slave valve 117 in conjunction with the manual valve 116 engages the proper pairs of drive motors to provide six ratios as explained below under "Drive Operation."

Lock-Up Clutch Valve

Lock-up clutch valve 121 is a manually operated rotary valve which has a rotary element 259 having a port 260 connecting, in the engaged position, main line 112 to the lock-up clutch line 261 while blocking the exhaust 262. In the disengaged position this valve blocks the main line 112 and exhausts the lock-up clutch line 261 to exhaust 262. The clutch cooling line 275 is connected by the lock-up clutch valve 121 through port 286 to the lock-up clutch cooling line 287 when the valve is in the engaged position. The handle 263 operates this rotary valve.

Power Take-Off Valve

The power take-off clutch valve 122 also has a rotary valve element 264 having a port 265 which, in the engaged position, connects the main line 112 to the power take-off clutch line 266 and blocks the exhaust 267. In the disengaged position this valve connects the power-take-off clutch line 266 to exhaust 267 while blocking the main line 112. The line 275 is similarly connected by port 288 of the power take-off valve 122 when in the clutch engaged position to the power take-off clutch cooling line 289. This valve may be a simple rotary valve having a control handle 268.

Trimmer Valve

A trimmer valve 271 may be employed to control the pressure rise in the lock-up clutch motor 35 and the power take-off motor 43 during engagement of the clutches. The trimmer valve has a piston 272 located in a bore 273 which is resiliently biased to the closed position by a spring 274. Main line 112 is connected to the bore to act on the piston 272 to urge it against the force of the spring 274 to vent line 112 to an exhaust which may be advantageously connected to a clutch cooling line 275. The spring chamber is vented by exhaust 276. Spring 274 abuts on a piston 277 which is slidably mounted in an enlarged bore portion 278. Line 112 is also connected through an orifice 279 to the bore 278 to move the piston 277 to increase the biasing force of spring 274 to increase the pressure in line 112 in accordance with the pressure in line 112 and the duration of this pressure. The check valve 281 arranged in by-pass relation to the orifice 279 permits rapid exhaust of fluid from the bore 278 to permit the piston 277 and the spring 274 to return to their normal positions as shown.

When either the lock-up clutch valve 121 or the power take-off valve 122 is opened to engage the clutch the fluid at main line pressure supplied by regulator valve 130 to the main line 112 will flow via line 261 or 266 to motor 35 or 42 respectively. Since the motor is exhausted, the pressure at the motor will drop to zero and increase to a very low pressure on initial movement of a motor piston. The pressure drop in the line 112 between the regulator valve 130 and the motors is proportional to line friction. The trimmer valve 271 should be connected to line 112 at a point at which the pressure drop is sufficient with regard to both pressure and time to permit the spring to force the oil from chamber 278 through check valve 281 to permit piston 277 to return to the initial position shown. If the pressure drop in the line is insufficient an orifice 282 may be employed to provide the proper pressure drop. Then the pressure in the motor for the clutch being engaged will increase to the initial pressure regulated by the valve 271 with the abutment 277 in the end position. Since line pressure is also connected via orifice 279 to move piston 277 and increase the biasing force of spring 274 the clutch apply pressure will be regulated at a value increasing at a rate proportional to the pressure in the clutch motor and the time or duration that this pressure exists until the regulated pressure supplied to the clutch motor is raised to main line pressure. This provides soft and shockless clutch engagement.

*Operation*

When the engine is started the transmission pump 126 will supply fluid at a pressure regulated by the regulator valve 111 to the main line 112. With the soft clutch apply valve 157 in normal position supplying main line pressure to cylinder 142 to move the piston 141 against the abutment 140, the regulator valve will regulate main line pressure at a high value, i.e. 90 pounds. When it is desired to provide a softer clutch application the main line pressure may be reduced to a lower value, i.e. 30 pounds, by moving the soft clutch apply valve 157 to the soft position blocking the branch 156 of the main line and connecting the cylinder 142 via line 158 to exhaust 159 to permit the piston 141 to move back to the end of the cylinder 142 to reduce the biasing force of spring 138 and thus condition the regulator valve 111 to regulate the main line pressure at a low value, i.e. 30 pounds or p.s.i.

With snubber valve 114 in neutral position the main line 112 is blocked and the three-speed unit ratio engaging device motors are exhausted through the slave valve 117, the ratio control lines, and the manual valve 116 either to exhaust 225 or exhaust line 162 and exhaust 183 of the snubber valve and the two-speed unit ratio engaging devices are exhausted at slave valve exhaust 245 or via line 210 to snubber valve exhaust 181. Thus, all the ratio engaging devices of the six-speed gear unit 14 are not engaged and there is a positive neutral. However, the line 112 is directly connected to the lock-up clutch valve 121 and the power take-off clutch valve 122 and thus both the lock-up clutch and the power take-off clutch 42 may be engaged at any time while the engine is running. The trimmer valve 271 will on the engagement of the lock-up or power take-off clutch operate to regulate the pressure increase for a smooth shift as explained above.

As explained above whenever the trimmer valve 271 regulates the pressure in line 112 supplied to a clutch motor, fluid is exhausted to the cooling line 275. Line 275 will be connected by either lock-up clutch valve 121 or power take-off valve 122 to lock-up clutch cooling line 287 or power take-off clutch cooling line 289 to cool the lock-up power take-off clutches respectively when they are being engaged.

*Drive Operation*

To drive the vehicle or transmission output, the snubber valve is placed in drive position as shown, connecting main line 112 to the supply line 161 which is connected to the control valve 118 and the accumulator 119 to regulate the pressure in the ratio line 210. The exhaust line 162 from the manual valve 116 is connected through the snubber valve to exhaust 183.

The ratio line 210 is connected by the manual valve 116 and slave valve 117 to a pair of clutch motors in each ratio position to engage a drive ratio. In Table I the drive device motors marked "X" are engaged.

TABLE I

| Ratios | Two-Speed Unit | | Three-Speed Unit | | |
|---|---|---|---|---|---|
| | Under-drive (58) | Direct Drive (63) | Low (74) | Int. (84) | High (86) |
| 1 | X | | X | | |
| 2 | X | | | X | |
| 3 | | X | X | | |
| 4 | X | | | | X |
| 5 | | X | | X | |
| 6 | | X | | | X |

With the manual valve 116 in the neutral position the first through sixth ratio control lines 211 through 216 are exhausted by exhaust 162 and thus all the ratio engaging devices of the three-speed unit are disengaged, placing the transmission in neutral.

Since the slave valve 117 is in the normal or direct drive position as illustrated in which a branch of the ratio line 210 is connected between the lands d and e to the direct drive clutch motor 63, the two-speed unit 12 will be in direct drive if the engine is running.

On movement of the manual valve to the first ratio position fluid is supplied through ratio line 210 to the first ratio control line 211 which is connected to the bore 237 between the land f and the plug 238 to move the valve element 236 to the underdrive position connecting the ratio line 210 between the lands e and f to the underdrive clutch line 252 to actuate the underdrive clutch motor 58 for underdrive in the two speed unit. Control line 211 is also connected between the lands c and d of valve element 236 to the low clutch line 253 to engage the motor 74 for low ratio in the three-speed unit. Thus, in first ratio underdrive in the two-speed unit and low in the three-speed unit is provided.

When the manual valve 116 is moved to the second ratio position ratio line 210 is connected by second ratio control line 212 between the plugs 238 and 239 to hold the valve element 236 in the underdrive position connecting ratio line 210 to the underdrive clutch line 252 and by line 212 between the lands b and c to the intermediate clutch line 254. These connections will engage the underdrive motor 58 of the two-speed unit and the intermediate motor 84 of the three-speed unit to provide second ratio drive.

In third position the manual valve 116 connects ratio line 210 to the third control line 213 which will permit the spring 242 to return the valve element 236 to the direct drive position connecting the ratio line 210 to the direct drive clutch line 251 and connecting the second control line 213 between lands c and d to the low clutch line 253. These connections will actuate direct clutch motor 63 of the two-speed unit and the low clutch motor 74 of the three-speed unit to provide third ratio drive.

Valve 116 in the fourth ratio position will connect ratio line 210 to the fourth control line 214 which is connected to the right end of bore 237 and acts on the plug 239 to move the valve element 236 to the underdrive position connecting ratio line 210 to underdrive clutch line 252. In the underdrive position valve 236 connects the fourth control line 214 between the lands a and b to the high clutch line 256. This will engage low ratio in the two-speed unit and high ratio in the three-speed unit for fourth ratio drive.

When the manual valve 116 is moved to the fifth ratio position ratio line 210 is connected to the fifth ratio control line 215. Since line 215 is not connected to the valve plugs, the spring returns the slave valve element 236 to the direct drive position connecting ratio line 210 to the direct clutch line 251 and the fifth control line 215 between the lands b and c to the intermediate clutch line 254. Direct drive in the two-speed unit and intermediate in the three-speed unit establishes the fifth ratio.

In sixth ratio the manual valve connects the ratio line 210 to the sixth control line 216 which is not connected to the plugs 238 and 239. Thus, valve 236 remains in the direct drive position supplying fluid from line 210 to direct clutch line 251 and from the sixth control line 216 between the lands a and b to the high clutch line 256. Thus, direct drive in the two-speed unit and high in the three-speed unit is engaged to provide sixth ratio. In each of these ratio positions of the manual valve 116, each of the first through the sixth control lines 211 through 216 which is not being supplied with fluid from the ratio line 210 is connected to the exhaust line 162 or the exhaust 225.

Whenever the manual valve 116 is shifted from one ratio to another the pressure in ratio line 210 is connected by a clutch line to a disengaged ratio motor and thus will drop substantially to zero. Then the flow control valve 118 and the accumulator 119 will control the pressure rise at the ratio motor being engaged in accordance with the curve shown in FIG. 5. The pressure will initially rise quickly or at a high rate to a low value, illustrated at 20 pounds on the pressure curve, since fluid will be supplied to the motor being engaged both by discharge from the accumulator and the larger secondary orifice. This action of the pressure supply system will provide a fast flow and a fast pressure rise to fill the ratio engaging motor at a pressure insufficient to overcome the retraction springs and thus during this fast fill the clutch of the ratio engaging device will not be engaged. At the low pressure value, i.e. 20 pounds, the control valve 118 will be moved to the restricted flow primary orifice position illustrated in which the flow from the ratio supply line 161 will flow through both orifice 191 and small primary orifice 198 at a slow rate. In addition a portion of this fluid will be used to fill or charge the accumulator 119. Thus, the rate of flow to the line 210 and the ratio motor being engaged and thus expanding is substantially reduced and the pressure rise continues to increase at a slow rate. During this slow rate of pressure rise the ratio engaging device will initiate and complete its engagement to provide a soft shockless shift. With increasing drive torque requirements at the time of engagement the completion of engagement will occur at a higher pressure during the slow pressure rise, but always before the change to a faster rate of pressure rise. Then, for example, at a high pressure value, i.e. 80 pounds, the accumulator will be fully charged and no longer receive fluid from the supply line 161. Thus, though the supply is still connected through both the secondary orifice 191 and the primary orifice 198, since the accumulator is fully charged and the ratio motor is filled, the rate of fluid supply will be increased above the high pressure value to provide a faster supply to the ratio engaging motor to quickly increase the pressure to full main line pressure to provide firm engagement of the ratio engaging device during drive. It will be noted that the high rate of pressure rise above the high pressure value is less than the rate of pressure rise below the low pressure value since the accumulator is not effective above the high pressure value. Though in the preferred form the accumulator is fully discharged at the same pressure at which the control valve is actuated, i.e. 20 pounds, these operations may occur at different pressures below the initial drive device engaging pressure. If, for example, the valve 118 was actuated at 30 p.s.i. to place the primary orifice 198 into the circuit the system would provide a pressure rise curve, similar to that in FIG. 5, but having a straight line pressure rise curve portion between 20 and 30 p.s.i. at a rate intermediate of the rates of the pressure rise curve portion from 0 to 20 p.s.i. and from 20 to 80 p.s.i. as shown in FIG. 5. The other portions would be the same as FIG. 5. When the valve 118 acts at a higher pressure or a lower pressure the rate of change of the pressure rise curve at the low value before clutch engagement is initiated is less abrupt. Thus, the rate of pressure rise in the ratio engaging motors can be tailored to provide a relatively fast fill during an initial stage such as that required to fill the motor and take up slack in the ratio engaging device, a slower fill and pressure rise during ratio engaging for soft engagement and a fast pressure rise after engagement to prevent slip.

*Snubber*

To snub or brake the vehicle or transmission output for synchronizing the gearing, the snubber valve 114 is moved to the snubber position to simultaneously engage more than one ratio in the gearing. When the valve element 166 is moved to the snubber position the spring 178 is compressed and the ball detent 168 engages a sloped cam surface 171 so that the valve element 166 is resiliently urged back to the neutral position. Thus, the operator may apply this valve in the same manner as a vehicle brake which returns to the off position when the operator's pressure is released. In the neutral and snubber position the valve 114 connects supply line 161 to exhaust 181 so that the ratio engaging devices are disengaged. In the snubber position, the main line 112 is connected between the lands b and c to exhaust line 162. The exhaust line 162 supplies fluid to the bore 222 to act on the unbalanced area of the land d to move the manual valve element 221 from any ratio position to neutral in order to connect the main line 112 via exhaust line 162 to all of the ratio control lines 211 through 216. When all of these lines are supplied the fluid in lines 211, 212 and 214 acts to move the slave valve to the underdrive position. The two-speed unit 12 will be in neutral since the underdrive motor 58 is connected by clutch line 252, ratio line 210, supply line 161 and valve 114 to exhaust 181 and direct ratio motor 63 is connected by clutch line 251 between the lands d and e of valve element 236 to exhaust 246. However, the high, intermediate and low ratio engaging devices are simultaneously engaged. High ratio motor 86 will be supplied by the high clutch line 256 which is connected between the lands a and b of valev element 236 to ratio line 214. Intermediate motor 84 will be supplied by the intermediate ratio line 254 which will be connected between the lands b and c to ratio control line 212. The low motor 74 is connected by the low ratio line 253 between the lands c and d to the first control line 211. The engagement of these three ratios will tend to lock up the gear unit and retard the rotation of output shaft 94.

Modified Control Valve

Figure 4:
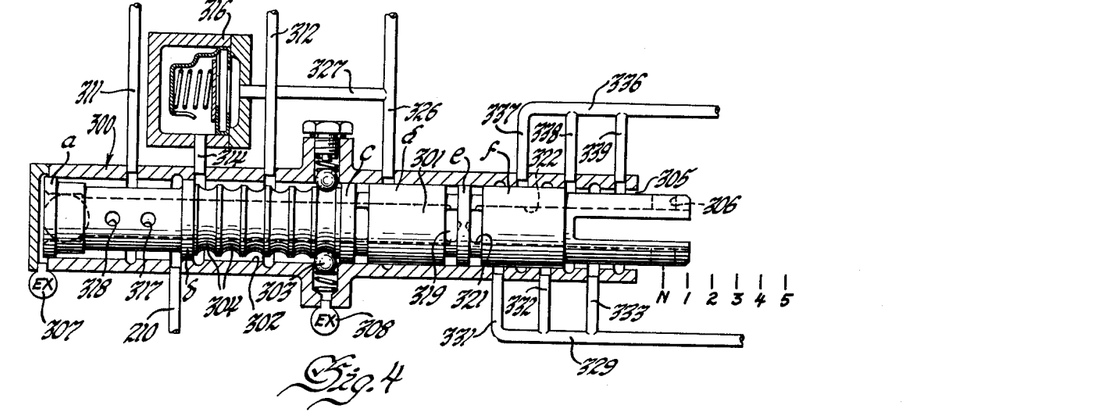
FIG. 4 shows a modified manual control valve.

The modified control valve 300 shown in FIG. 4 provides five forward ratios in five consecutive positions and thus may replace the manual valve 116 and slave valve 117 of FIG. 2. The valve 300 has a valve element 301 having lands *a, b, c, d, e* and *f* of equal diameter located in a bore 302. The valve is resiliently held in each ratio position and neutral by a spring biased ball detent 303 which cooperates with a groove 304 for each ratio and neutral. The valve extends from the open end 305 of the bore and has suitable apertures 306 for connection to the operating mechanism. The bore 302 is exhausted at the open end 305, at the opposite end by exhaust 307 and at the detent 303 by exhaust 308. The ratio line 210 which supplies fluid from a source is connected to the bore 302 between the lands *a* and *b* in all positions of valve movement. Fluid is supplied to the underdrive motor 58 of the two-speed gear unit 12 by the underdrive ratio engaging line 311 which is connected to the bore 302 so that it is connected between the lands *a* and *b* to line 210 in neutral, first, second and third ratio positions. In the fourth and fifth positions the line 311 is connected to exhaust 307 to disengage the underdrive clutch 58. The direct drive motor 63 for the front unit 12 is connected by line 312 between the lands *b* and *c* to the exhaust 308 in neutral and the first, second and third positions. In the fourth and fifth positions line 210 is connected between the lands *a* and *b* to line 312 to engage the direct drive motor 63. In all positions except neutral the ratio line 210 is connected between the lands *a* and *b* to the line 314 to supply fluid to the back side of the check valve 316 to hold the check valve 316 closed. The line 210 is also connected between the lands *a* and *b* and through the center of the valve element via port 317, bore 318 and port 319 to the space between the lands *c* and *d* and the space between the lands *d* and *e*. The space between the lands *e* and *f* is connected by a port 321 and exhaust bore 322 extending to the operating end of the valve. The low line 326 is connected to the low ratio motor 74 of the three-speed unit 14 and via branch 327 to the front side of the check valve 316 and to the bore 302. In the neutral position though land *d* blocks line 326 it is exhausted via branch 327, check valve 316, line 314 and between lands *b* and *c* to exhaust 308. In the first position low line 326 is connected between the lands *c* and *d* and bore 318 to ratio line 210. In all other positions of the valve 301 the line 326 is connected between the lands *b* and *c* to the exhaust 308. The line 329, which supplies the intermediate ratio motor, has three branches 331, 332 and 333 connected to the bore 302 adjacent the land *f*. In neutral, the branch 333 is connected to exhaust 305. In first ratio position branch 333 is connected to exhaust 305 and the branch 331 is connected to exhaust bore 322. In second ratio position branch 331 is connected between the lands *d* and *e* and bore 318 to main line 112 and the land *f* blocks branches 332 and 333. In third ratio position the land *d* blocks branch 331, land *f* blocks branch 333 and branch 332 is connected between the lands *e* and *f* to the exhaust 322. In fourth ratio position the land *d* blocks branch 331 and land *f* blocks branch 333 and line 210 is connected to the bore 318 between the lands *d* and *e* to branch 332. In fifth ratio position the land *d* blocks branches 331 and 332 and connects branch 333 between lands *e* and *f* to the exhaust 322. The high ratio line 336 supplies the high motor 86 and has three branches 337, 338 and 339 connected to the bore 302 adjacent the land *f*. In the neutral, first and second positions branch 339 is connected to exhaust 305. In the third ratio position the land *f* blocks branches 338 and 339 and line 210 is connected by bore 318 and between lands *d* and *e* to branch 337 to engage the motor 86. In fourth position the branch 338 is connected to exhaust between the lands *e* and *f* to exhaust bore 322 while the land *d* blocks branch 337 and the land *f* blocks the branch 339. In fifth ratio position though the lands *e* and *f* continue to block respectively the branches 337 and 339 the ratio line 210 is connected through the bore 318 between the lands *d* and *e* to the branch 338 to engage the high motor 86. It will thus be seen that valve 300 provides connections to the proper clutches in both the two-speed unit 12 and the three-speed unit 14 to provide ratios in accordance with the Table II shown below.

TABLE II

| Ratio | Two-Speed Unit | | Three-Speed Unit | | |
|---|---|---|---|---|---|
| | Under-drive | Direct Drive | Low | Int. | High |
| 1 | X | | X | | |
| 2 | X | | | X | |
| 3 | X | | | | X |
| 4 | | X | | X | |
| 5 | | X | | | X |

In neutral position the underdrive motor 58 of the front unit is engaged since line 210 is connected between the lands *a* and *b* to the line 311. The direct drive ratio line 312 is connected between the lands *b* and *c* to exhaust 308. The low ratio line 326 is connected to the branch 327 to check valve 316, line 314 between the lands *b* and *c* to exhaust 308. The intermediate ratio line 329 is connected by branch 333 and high clutch line 336 is connected by branch 339 to exhaust 305. In first ratio position line 210 is connected between the lands *a* and *b* to the underdrive ratio line 311 and through the bore 318, and between lands *c* and *d* to the low ratio line 326 to engage underdrive of the two-speed unit and low ratio in the three-speed unit to provide first ratio. The other lines remain connected to exhaust. In the second ratio position line 210 remains connected to the underdrive clutch line 311 and the bore 318 is connected between the lands *d* and *e* to the branch 331 of the intermediate ratio line 329 to engage underdrive of the two-speed unit and intermediate in the three-speed unit for second ratio. Direct drive remains connected to exhaust and low ratio line 326 is connected between the lands *b* and *c* to exhaust 308. In third ratio the main line remains connected in the same way to underdrive line 311 and is connected by the bore 318 between the lands *d* and *e* to the branch 337 of high ratio line 336 to engage underdrive in the two-speed unit and high in the three-speed unit to provide third ratio drive. The direct drive line 312 remains connected to exhaust 308 and the low ratio line 326 remains connected to exhaust 308. The intermediate ratio line 329 is connected by branch 332 to exhaust 322.

In fourth ratio and fifth ratio position the main line 112 is connected between the lands *a* and *b* to direct drive ratio line 312. The underdrive ratio line 311 is connected to exhaust 307. In fourth position the main line 112 is connected by the bore 318 between the lands *d* and *e* to branch 322 of intermediate ratio line 329 to engage direct drive in the two-speed unit, and intermediate in the three-speed unit to provide fourth ratio. The low ratio line 326 is connected to exhaust 308 and the high ratio line 336 is connected by branch 338 to exhaust 322. In the fifth ratio position the high clutch line 336 is connected via bore 318 of the main line to engage direct drive of the two-speed unit and high of the three-speed unit for fifth ratio. The intermediate ratio line 329 is connected by branch 333 to exhaust 322. This valve may be used with the system illustrated in FIGS. 2 and 3 as a replacement for manual valve 116 and the slave valve 117. In this arrangement the snubber valve will provide neutral and drive but does not provide snubbing, or the snubber valve may be omitted and the lines 112 and 161 joined together.

The above described specific embodiments are illustrative of the invention and it will be appreciated that they may be modified within the scope of the appended claims.

We claim:

1. In an automatic transmission, a drive unit having fluid operated means operable to initiate engagement of a drive at a predetermined low pressure value range and to complete engagement of said drive at a predetermined high pressure value range, a source of fluid pressure regulated at a substantially constant value above said predetermined high pressure value range, means including an accumulator and flow means connecting said source through control valve means to said drive unit to engage said drive and to exhaust said drive unit to disengage said drive unit, said accumulator and flow means having means responsive to pressure engaging said drive unit to supply said drive unit with a high volume of fluid discharged from said accumulator and fluid supplied by said flow means when operating under a first condition at pressures below said predetermined low pressure value range and to supply fluid to said drive unit at a low rate due to the accumulation of fluid in said accumulator and the restricted flow of said flow means in a second condition in and between said predetermined low and high pressure value ranges and to supply fluid at a faster rate to said drive unit through said flow means in a third condition of operation without accumulation in or discharge from said accumulator above said predetermined high pressure value.

2. In an automatic transmission, a drive unit having fluid operated means operable to initiate engagement of a drive at a predetermined low pressure value range and to complete engagement of said drive at a predetermined high pressure value range depending on torque, a source of fluid pressure regulated at a substantially constant value above said predetermined high pressure value range, an accumulator operative between the fully discharged position at a pressure less than said predetermined low pressure value range and a fully charged position at said predetermined high pressure value range, flow means continuously connecting said source to said accumulator providing full flow under a first condition of operation and providing a restricted flow under a second condition of operation, control valve means connecting said accumulator to said drive unit to engage said drive and to exhaust said drive unit to disengage said drive unit and means responsive to said pressure engaging said drive unit to cause said flow means to operate in said first condition below said predetermined low pressure value range and in said second condition at and above said predetermined low pressure value range to supply said drive unit with a high volume of fluid discharged from said accumulator and from said flow means operating under said first condition at pressures below said predetermined low pressure value range and to supply fluid to said drive unit at a low rate due to the accumulation of fluid in said accumulator and the restricted flow of said flow means between said predetermined low and high pressure value range and to supply fluid at a faster rate to said drive unit through said flow means in said second condition of operation without accumulation or discharge of fluid in said accumulator above said predetermined high pressure value range.

3. In an automatic transmission, a drive unit having fluid operated means operated at a predetermined low pressure value range to initiate drive engagement and completing drive engagement at a predetermined high pressure value range, a source of fluid pressure regulated at a substantially constant value higher than said high pressure value range, an accumulator operative between a fully discharged position at an accumulator discharge maximum pressure less than said predetermined low pressure value range, and a fully charged position at an accumulator charge pressure above said predetermined high pressure value range and below the regulated pressure of said source, flow means continuously connecting said source to said accumulator in a first position providing full flow and in a second position through an orifice providing restricted flow, control valve means connecting said accumulator to said drive unit to engage said drive, and means responsive to the pressure of the fluid engaging said drive unit to move said flow means from said first to said second positions at a pressure less than said predetermined low pressure value range and other than said accumulator discharged maximum pressure to change the rate of flow to said fluid operated means in two distinct steps.

4. In an automatic transmission, a drive unit having fluid operated means operated at a predetermined low pressure value range to initiate drive engagement and completing drive engagement at a predetermined high pressure value range, a source of fluid pressure regulated at a substantially constant value, an accumulator operative between a fully discharged position at a maximum fully discharged pressure substantially above zero and not greater than said predetermined low pressure value range and a fully charged position at a minimum fully charged pressure not less than said predetermined high pressure value range, flow means continuously connecting said source to said accumulator in a first position providing full flow and in a second position through an orifice providing restricted flow, control valve means connecting said accumulator to said drive unit to engage said drive, and means responsive to the pressure of the fluid engaging said drive unit to move said flow means from said first to said second positions at a pressure not greater than said predetermined low pressure value range.

5. In an automatic transmission, a drive unit having fluid operated means operable to engage a drive, a source of fluid pressure regulated at a substantially constant value, an accumulator operative between a fully discharged position at a predetermined low pressure value greater than zero and a fully charged position at a predetermined high pressure value, flow means continuously connecting said source to said accumulator in a first position to supply a high rate of flow to said accumulator and in a second position through an arifice providing a restriction and a reduced rate of flow to said accumulator, control valve means in one position providing a connection from said accumulator to said drive unit to engage said drive and in another position exhausting said drive unit to disengage said drive unit and blocking said connection from said accumulator, and means responsive to said pressure engaging said drive unit to move said flow means from said first to said second position at said predetermined low pressure value.

6. In an automatic transmission, a drive unit having fluid operated means operable to engage a drive, a source of fluid pressure regulated at a substantially constant value, an accumulator operative between a fully discharged position at a predetermined low pressure value range above zero pressure, and a fully charged position at a predetermined high pressure value range less than the pressure of said source, flow means connecting said source continuously to said accumulator in a first position to provide a high flow rate and in a second position through an orifice providing a restriction and a low flow rate, control valve means connecting said accumulator to said drive unit to engage said drive and exhausting said drive unit to disengage said drive unit and blocking flow from said accumulator, means responsive to said pressure engaging said drive unit to move said flow means from said first to said second position at said predetermined low pressure value range and means operative for engaging said drive to reduce the regulated pressure of said source to a value less than said predetermined high pressure value range to further soften the engagement of said drive selectively operative at the will of the operator.

7. In an automatic transmission, a drive unit having fluid operated means operated at a predetermined low pressure value range to initiate drive engagement and completing drive engagement at a predetermined high pressure value range, a source of fluid pressure regulated at a substantially constant value above said predetermined high pressure value range, an accumulator operative between the fully discharged position at a pressure less than said predetermined low pressure value range and above zero pressure and a fully charged position above said predetermined high pressure value range, flow means continuously connecting said source to said accumulator in a first position providing full flow and in a second position through an orifice providing restricted flow, control valve means connecting said accumulator to said drive unit to engage said drive, means responsive to the pressure of the fluid engaging said drive unit to move said flow means from said first to said second positions at a pressure less than said predetermined low pressure value and greater than zero pressure, and means operative at the will of the operator independent of said control valve means to reduce the regulated pressure of said source to a value between said predetermined low and high pressure value ranges for engaging said drive.

8. In a transmission, a drive unit having an input and output member providing a plurality of ratios and having a plurality of fluid operated means selectively operable to engage each of said plurality of ratios and simultaneously operable to retard said output member, a source of fluid under pressure, a supply line, an exhaust line, a control valve in a drive position connecting said source to a supply line and connecting said exhaust line to exhaust and in a snubbing position connecting said source to said exhaust line and supply line to exhaust, a ratio control valve connecting said supply line selectively to each of said plurality of hydraulically operated devices to selectively engage each of the plurality of ratios and to connect the disengaged hydraulically operated devices to said exhaust line and having means responsive to pressures in said exhaust line to actuate said ratio control valve automatically to simultaneously engage a plurality of said ratios to lock said drive unit for snubbing the output member.

9. In a transmission, a first and a second fluid actuated drive establishing means, a source of constant fluid pressure, a supply line connecting said source to said first and second fluid actuated drive establishing means, a first control valve in said supply line connecting said source to said first drive establishing means, a second control valve in said supply line connecting said source to said second drive establishing means, regulator valve means connected to said supply line between said source and said first and second control valves controlled after opening a control valve for operation in a first position to regulate the pressure in said supply line at reduced pressure value and to exhaust excess fluid, means operative after a controlled delay to increase said controlled pressure, and means to reset said regulator valve means to said first position on the opening of a control valve.

10. In a transmission according to claim 9, and said fluid actuated drive establishing means including friction members, and said control valve actuating means to connect said exhaust from said regulator valve means to the fluid actuated drive establishing devices to cool said friction members.

11. In a transmission, a first and a second fluid actuated drive establishing means, a source of constant fluid pressure, a supply line connecting said source to said first and second fluid actuated drive establishing means, a first control valve in said supply line connecting said source to said first drive establishing means, a second control valve in said supply line connecting said source to said second drive establishing means, said drive establishing means each having an expansible fluid chamber operable during the drive establishing stroke to initially receive a large volume of fluid at a low pressure reducing the pressure in said supply line to a reduced value at points proportional to the flow resistance between a point and said chamber and to gradually require increasing pressure in said chamber as the drive engagement is completed, regulator valve means connected to said supply line between said source and said first and second control valves at a point of substantially reduced pressure having a valved element controlled by biasing means in a first position to regulate the pressure in said supply line at reduced pressure, means to increase the biasing force of said biasing means, and means to reset said biasing means to said first position responsive to actuation of a control valve.

12. In a transmission, a first and a second fluid actuated drive establishing means, a source of constant fluid pressure, a supply line connecting said source to said first and second fluid actuated drive establishing means, a first control valve in said supply line connecting said source to said first drive establishing means, a second control valve in said supply line connecting said source to said second drive establishing means, said drive establishing means each having an expansible fluid chamber operable during the drive establishing stroke to initially receive a large volume of fluid at a low pressure reducing the pressure in said supply line to a reduced value at points proportional to the flow resistance between said points and said chamber and to gradually require increasing pressure in said chamber as the drive engagement is completed, regulator valve means connected to said supply line between said source and said first and second control valves at a point of substantially reduced pressure having a valved element controlled by biasing means in a first position to regulate the pressure in said supply line at an intermediate value below the pressure of said source and above said reduced pressure value at said point and to exhaust excess fluid, means connecting said supply line at a point of reduced pressure to actuate means to increase the biasing force of said biasing means, and means to reset said biasing means to said first position on a momentary reduction of pressure in said supply line due to the opening of a control valve.

13. In a transmission, a drive unit providing a plurality of ratios and having a plurality of fluid operated means selectively operable to engage a pair of fluid operated means to establish each of said ratios, a source of fluid under pressure, manual control valve means for drive operation connecting said source in a plurality of ratio positions selectively to each of a plurality of ratio control lines, a slave valve having a first and a second position, means connecting said source to said slave valve, said slave valve in said first position connecting said source to one ratio establishing device and in said second position connecting said source to a second ratio establishing device, and said ratio control lines comprising one ratio control line connected by said slave valve in said first position to a third ratio establishing device and another ratio control line connected to said slave valve to move said valve from said first to said second position and said slave valve in said second position connecting said other ratio control lines to said third drive establishing device.

14. In a transmission according to claim 13, and a snubber valve in a first position connecting said source to said manual control valve for said drive operation and in a second position connecting said source to said manual valve to simultaneously apply a plurality of ratios to brake and snub the transmission.

15. In a transmission, a drive mechanism including a first unit having a first and second fluid actuated ratio establishing device and a second unit having a third, fourth and fifth fluid actuated ratio establishing device connected in series to provide a first, second, third, fourth, fifth and sixth ratio, a source of fluid under pressure, a manual valve selectively connecting said source to a first through a sixth ratio control line, a slave valve having a valve element biased to a first and movable to a second position by said first, second and fourth ratio control lines and connecting said source to said second fluid actuated ratio device and said third, fifth and sixth ratio control lines respectively to said third, fourth, and fifth ratio establishing devices in a first position and connecting said source to said first ratio establishing device and said first, second and fourth ratio control lines respectively to said third, fourth and fifth ratio establishing devices in a second position, and said first, second and fourth ratio control lines being connected to said slave valve to move said slave valve from said first to said second position.

16. In a transmission, a drive mechanism including a first unit having a first and second fluid actuated ratio establishing device and a second unit having a third and fourth fluid actuated ratio establishing device connected in series to provide a first, second, third and fourth ratio, a source of fluid under pressure, a manual valve selectively connecting said source to a first through a fourth ratio control line, a slave valve having a valve element movable from a first to a second position and connecting said source to said second fluid actuated ratio device in a first position and to said first ratio establishing device in a second position, said first ratio control line connected to said slave valve to move said slave valve from said first to said second position to connect said source to said first ratio establishing device and said first ratio control line to said third ratio establishing device, said second ratio control line connected to said slave valve to move said slave valve to said second position connecting said source to said first ratio establishing device and said second ratio control line to said fourth ratio establishing device, said third ratio control line being connected by said slave valve to said third ratio establishing device and said source being connected to said second ratio establishing device, said fourth ratio control line being connected by said slave valve to said fourth ratio establishing device and said source being connected to said first ratio establishing device.

17. In a transmission, a drive unit providing a plurality of ratios and having a plurality of fluid operated means selectively operable to establish each of said ratios, a source of fluid under pressure, manual valve means having neutral, first and second ratio positions and means operative in said first ratio position to selectively connect said source to one of said ratio establishing devices including a connection to one ratio establishing device, means operative in said neutral position to block said connection, a one-way by-pass exhaust passage from said connection to said one ratio establishing device connected to said valve, and said valve having a connection to supply fluid pressure except in neutral position to the outlet of said one-way by-pass exhaust passage to block exhaust flow.

18. In a transmission, a drive unit providing a plurality of ratios and having a plurality of fluid operated means selectively operable in pairs to establish each of said ratios, a source of fluid under pressure, manual valve means having neutral, first and second ratio positions and means operative in said first ratio position to selectively connect said source to a pair of said ratio establishing devices including a connection to one ratio establishing device, means operative in said neutral position to block said connection, a one-way by-pass exhaust passage from said connection to said one ratio establishing device connected to said valve, and said valve having means to supply fluid pressure except in neutral position to the outlet of said one-way by-pass exhaust passage to block exhaust flow.

19. In an automatic transmission, a drive unit having fluid operated means operable to initiate engagement of a drive at a predetermined low pressure value range and to complete engagement of said drive at a predetermined high pressure value range, a source of fluid pressure regulated at a substantially constant value above said predetermined high pressure value range, control means including an accumulator and flow means connecting said source through a control valve to said drive unit to supply fluid to engage said drive unit and to exhaust said drive unit to disengage said drive unit, said accumulator having pressure responsive means responsive to the pressure engaging said drive unit to operate said accumulator to supply to said drive unit a high volume of fluid discharged from said accumulator when said engaging pressure is below said predetermined low pressure value range and to accumulate fluid when and only when said engaging pressure is in and between said low and high pressure value ranges, and said flow means having pressure control means responsive to the pressure engaging said drive unit to operate said flow means to provide a high rate supply to said drive unit when said engaging pressure is less than said low pressure value range and to provide a low rate supply when said engaging pressure is not less than said low pressure value range.

20. In a transmission, a multiratio drive unit having fluid operated means to operatively engage a plurality of drive ratios, a source of fluid under pressure, regulator valve means to regulate the pressure of said source of fluid at a constant normal pressure value and having control means operated by fluid pressure to change said normal pressure to another predetermined regulated pressure, manual means selectively operable at will to activate said control means to provide said normal pressure and to activate said control means of said regulator valve to change said regulated normal pressure value to said another predetermined pressure value and shift valve means operable independently of said manual valve for selectively connecting said source of pressure regulated by said regulator valve to said fluid operated means of said drive unit to provide engagement of the selected drive ratios either at said normal pressure value or at said another predetermined pressure value in accordance with the position of said manual means.

21. In a transmission, a multiratio drive unit having fluid operated means to operatively engage a plurality of drive ratios, a source of fluid under pressure, regulator valve means to regulate the pressure of said source of fluid at a constant normal pressure value including a valve element having an unbalanced area acted on by the pressure of said source to move said valve element in one direction and a spring seated on an abutment to move said valve element in the opposite direction, control means operated by fluid pressure operative to move said abutment to change said normal pressure to another predetermined pressure value, a manual valve selectively operable at will to disconnect said source from said control means of said regulator valve to control said regulator valve to regulate the pressure at said normal value and to connect said source to said control means of said regulator valve to change said regulated normal pressure value to said another predetermined pressure value and shift valve means operable independently of said manual valve for selectively connecting said source to said fluid operated means of said drive unit to provide engagement of said drive ratios either at said normal pressure value or at said another predetermined pressure value in accordance with the position of said manual valve.

22. In a transmission, a drive unit having fluid operated means to engage a drive, a sump, a pump connected to said sump providing fluid under pressure, a regulator valve connected to said pump to control the pressure of said pump, said regulator valve having a movable valve element located in a bore, said valve element having unbalanced area means including a land with an end surface forming a chamber in said bore, one-way valve means connecting said pump to said chamber to supply fluid under pressure to act on said end surface of said land of said unbalanced area means to provide unrestricted fluid flow from said pump to act on said unbalanced area and to prevent reverse flow from said chamber, said chamber of said valve bore having a continuously open restricted exhaust port means connected to said sump to continuously exhaust a restricted volume of fluid directly to said sump.

23. In a transmission, a drive unit having fluid operated means to engage a drive, a sump, a pump connected to said sump and providing fluid under pressure, a regulator valve connected to said pump to control the pressure of said pump, said regulator valve having a movable valve element located in a bore, said valve element having unbalanced area means including a land with an end surface forming a chamber in said bore, one-way valve means connecting said source to said chamber to supply fluid under pressure to act on said end surface of said land of said unbalanced area means to provide unrestricted fluid flow from said source to act on said unbalanced area and to prevent reverse flow from said chamber, said valve bore having an exhaust port connected to said sump covered by said land in all valve positions, and said land being smaller than said bore to provide a continuously open restricted cylindrical passage in said bore around said land to permit the continuous return of said fluid acting on said unbalanced area to said exhaust port and said sump.

24. In a transmission, a drive mechanism including a first unit having a first and second fluid actuated ratio establishing device and a second unit having a third and fourth fluid actuated ratio establishing device connected in series to provide a first, second, third and fourth ratio, a source of fluid under pressure, a manual valve selectively connecting said source to a first through a fourth ratio control line, a slave valve having a valve element biased to a first and movable to a second position by fluid under pressure supplied by said first and third ratio control lines, said slave valve in said first position connecting said source to said second fluid actuated ratio establishing device and said second and fourth ratio control lines respectively to said third and fourth fluid actuated ratio establishing devices, said slave valve in a second position connecting said source to said first ratio establishing device and said first and third ratio control lines respectively to said third and fourth ratio establishing devices, and means connecting said first and third ratio control lines to said slave valve to move said slave valve from said first to said second position.

25. In a transmission, a drive mechanism including a first unit having a first and second fluid actuated ratio establishing device and a second unit having a third and fourth fluid actuated ratio establishing device connected in series to provide a first, second, third and fourth ratio, a source of fluid under pressure, a manual valve selectively connecting said source to a first through a fourth ratio control line, a slave valve having a valve element biased to a first and movable to a second position by fluid under pressure supplied by two of said ratio control lines, said slave valve in said first position connecting said source to said second fluid actuated ratio device and said two of said ratio control lines respectively to said third and fourth ratio establishing devices, said slave valve in said first position connecting said source to said first ratio establishing device and the other of said ratio control lines respectively to said third and fourth ratio establishing devices, and means connecting said two of said ratio control lines to said slave valve to move said slave valve from said first to said second position.

26. In a transmission, a drive mechanism including a first unit having a first and second fluid actuated ratio establishing device and a second unit having a third and fourth fluid actuated ratio establishing device connected in series to provide a first, second, third and fourth ratio, a source of fluid under pressure, a plurality of ratio control lines, a manual valve selectively connecting said source to said plurality of ratio control lines, a slave valve having a valve element biased to a first and movable to a second position by fluid pressure supplied by one of said ratio control lines, said slave valve in said first position connecting said source to said second fluid actuated ratio device and the other of said control lines respectively to said third and fourth ratio establishing devices, said slave valve in said second position connecting said source to said first ratio establishing device and said one of said ratio control lines to one of said third and fourth ratio establishing devices, and means connecting said one of said ratio control lines to said slave valve to move said slave valve from said first to said second position.

27. In a transmission, a drive unit providing a plurality of ratios and having a plurality of fluid operated means selectively operable to establish each of said ratios, a source of fluid under pressure, manual valve means having a movable valve element movable in a bore having ports connected to exhaust, to said source, and to said plurality of fluid operated means and an outlet port, said valve element being movable to neutral, first, and second ratio positions, said valve element having means operative in one position to selectively connect said port connected to said source to said port connected to one of said ratio establishing means including a connection to said one ratio establishing means, said valve element having means operative in another position to block said port connected to one of said ratio establishing devices, a one-way bypass exhaust passage connecting said connection to said one ratio establishing means to an outlet port in said valve bore, and said valve element having a connection to supply fluid pressure from said source in said one position to said outlet port of said one-way bypass exhaust passage to block exhaust flow and a connection to connect said outlet port of said one-way bypass exhaust passage to said exhaust port in said another position.

28. In a transmission, a drive unit providing a plurality of ratios and having a plurality of fluid operated means selectively operable to establish each of said ratios, a source of fluid under pressure, manual valve means having a movable valve element movable in a bore having ports connected to exhaust, to said source, and to said plurality of fluid operated means and an outlet port, said valve element being movable to neutral, first and second ratio positions and said valve element having means operative in one ratio position to selectively connect said port connected to said source to said port connected to one of said ratio establishing means including a connection to said one ratio establishing means, said valve element having means operative in another position to block said port connected to one of said ratio establishing devices, a one-way bypass passage connecting said connection to said one ratio establishing means to said outlet port in said valve bore, and said valve element having a connection to supply fluid pressure from said source in one position to said outlet port of said one-way bypass passage and a connection to connect said outlet port of said one-way bypass exhaust passage to said exhaust port in the other position.

29. In a transmission, a drive unit providing a plurality of ratios and having a plurality of fluid operated ratio devices selectively operable to establish each of said ratios, a source of fluid under pressure, manual valve means having a movable valve element movable in a bore having an exhaust port, a source port connected to said source, a first port connected to a first ratio device, a second port connected to a second ratio device, third and fourth ports connected to a third ratio device and fifth and sixth ports connected to a fourth ratio device, said valve element being movable from a first to a fourth ratio position, said valve element having means operative in said first position to connect said source port to said first and third ports and to block said fourth port and connect said second and one of said fifth and sixth ports to exhaust, said valve element having means operative in said second position to connect said source to said first and said fifth ports and to block said sixth port, and to connect said second and one of said third and fourth ports to exhaust, said valve element having means operable in said third position connecting said source to said second and fourth port and to block said third port and to connect said first and one of said fifth and sixth ports to exhaust, and said valve element having means operable in said fourth position to connect said source to said second and said sixth ports and to block said fifth port and to connect said first and one of said third and fourth ports to exhaust.

30. In a transmission, a drive unit having fluid operated means operable to actuate a drive, a source of fluid under pressure, control means connecting said source to said fluid operated means including an accumulator and flow control means operative in one position to provide high flow and movable at a predetermined pressure value, in a small range of pressure values, to another position providing restricted flow, and said accumulator being initially charged with the fluid at a different predetermined pressure in said small range of pressure values to make a multiple step change from a high rate pressure rise to a low rate pressure rise in said fluid operated means.

31. In a transmission, a drive unit having fluid operated means operable to actuate a drive, a source of fluid under pressure, control means connecting said source to said fluid operated means including an accumulator which is discharged below a low accumulator pressure and charged between said low and high accumulator pressure, operable by receiving and discharging fluid to change the rate of flow to said fluid operated means during a change of volume of fluid in said accumulator, and including flow control means connected to control the flow from said source to said accumulator and said fluid operated device to provide in an open position a high rate of flow and to provide in a restricted position a low rate of flow and being responsive to the pressure being supplied to said fluid operated means to move said flow control means from one to another of said positions at a predetermined flow control pressure different from one of said accumulator pressures to change the rate of flow to said fluid actuated means at a sufficiently different pressure to provide two distinct steps in the change of the rate of flow to reduce hydraulic shock due to an abrupt change in the rate of flow.

32. In an automatic transmission, a drive unit providing a drive having fluid operated means operable to engage said drive, a source of fluid under pressure, accumulator means operative to receive fluid and to discharge fluid, flow control means having a variable restriction and pressure-responsive means operative to vary said variable restriction connecting said source through said variable restriction to said accumulator to vary the rate of flow, system control means including drive control means connecting said accumulator means to said fluid operated means operative in one position to permit greater flow than the flow through said variable restriction from said accumulator means to said fluid operated means and operative in another position to block flow from said accumulator means and to connect said fluid operated means to exhaust and including means to connect said fluid operated means to said pressure-responsive means.

33. The invention defined in claim 32 and said fluid operated means having retraction means preventing operation at pressure values below a predetermined low pressure value of said fluid operated means to effect a change in said drive, and said accumulator being initially charged at a first pressure and said flow control means being actuated at a second pressure value, and one of said first and second pressure values being substantially the same as said predetermined low pressure.

34. The invention defined in claim 32 and said fluid operated means having retraction means preventing operation of said fluid operated means at pressure values below a predetermined low pressure value, and said accumulator being initially charged and said flow control means being actuated to vary the restriction to reduce the flow rate as the pressure supplied to said fluid operated means increases past said low pressure value.

35. The invention defined in claim 32, said accumulator being initially charged at a first pressure value and said flow control means being actuated at a second pressure value, and both of said pressure values being less than the lowest pressure at which said fluid operated means initiates engagement of said drive.

36. The invention defined in claim 32 and both said accumulator being initially charged and said flow control means being moved to vary the restriction to decrease the flow at pressure values less than the lowest pressure value of the range of pressure values in which said fluid operated means makes a change in the drive.

37. The invention defined in claim 32 and said accumulator being initially charged at a pressure value and said flow control means being moved to vary the restriction to reduce flow at a pressure value and one of said pressure values being less than the lowest pressure of the range of pressure values in which said fluid operated means makes a change in the drive.

38. The invention defined in claim 32 and said accumulator being fully charged at a pressure value greater than the maximum pressure of the range of pressure values in which said fluid operated means makes a change in the drive.

39. In an automatic transmission, a drive unit providing a drive and having fluid operated means operable to engage said drive, a source of high pressure fluid, accumulator means operative to discharge below a controlled low pressure value and to accept a charge between said controlled low pressure value and a controlled high pressure value, flow control means connecting said source to said accumulator means having a restricted position requiring a low flow rate and a smaller restricted position requiring a lower flow rate and including pressure-responsive means movable by fluid under pressure to move said flow control means from one to another position, drive control means connecting said accumulator to said fluid operated means permitting a flow rate higher than said low flow rate in one position and blocking said connection from said accumulator means and connecting said fluid operated means to exhaust in another position to engage and disengage said drive, and means connecting said fluid operated means to said pressure-responsive means.

40. The invention defined in claim 39 and said fluid operated means having retraction means requiring a pressure greater than said low pressure value to overcome said retraction means.

41. The invention defined in claim 39 and said fluid operated means being operative to effect a change in said drive unit between engaged and disengaged positions at pressure values between said low pressure value and said high pressure value.

42. The invention defined in claim 39 and said flow control means being operative at one of said pressure values to move said flow control means from one to another position.

43. The invention defined in claim 39 and said source providing a higher regulated pressure than said controlled high pressure value charging said accumulator means.

44. The invention defined in claim 39 and said pressure-responsive means being operative at pressures above said low pressure value to place said flow control means in said smaller restricted position and at pressures below said low pressure value to place said flow control means in said restricted position.

45. The invention defined in claim 39 and said fluid operated means being operative in response to a range of pressures between said low pressure value and said high pressure value to initiate and complete a change in said drive, and said pressure-responsive means being operative in response to a pressure value close to said low pressure value to move said flow control means from said restricted position to said smaller restricted position.

46. The invention defined in claim 39 and said fluid operated means being operative in response to a range of pressures between said low pressure value and said high pressure value to initiate and complete a change in said drive, said pressure-responsive means being operative in response to a pressure close to said low pressure value to move said flow control means from said restricted position to said smaller restricted position, and said high pressure of said source being higher than said high pressure value charging said accumulator.

References Cited in the file of this patent

UNITED STATES PATENTS

| | | |
|---|---|---|
| 2,291,243 | Levy | July 28, 1942 |
| 2,376,545 | Livermore | May 22, 1945 |
| 2,516,203 | Greenlee et al. | July 25, 1950 |
| 2,663,393 | Livermore | Dec. 22, 1953 |
| 2,693,711 | Kelbel et al. | Nov. 9, 1954 |
| 2,695,696 | Iavelli | Nov. 30, 1954 |
| 2,702,618 | Baker et al. | Feb. 22, 1955 |
| 2,756,851 | Collins | July 31, 1956 |
| 2,807,968 | Forster | Oct. 1, 1957 |
| 2,845,817 | Polomski | Aug. 5, 1958 |
| 2,875,643 | Kelley | Mar. 3, 1959 |